Figure 1:
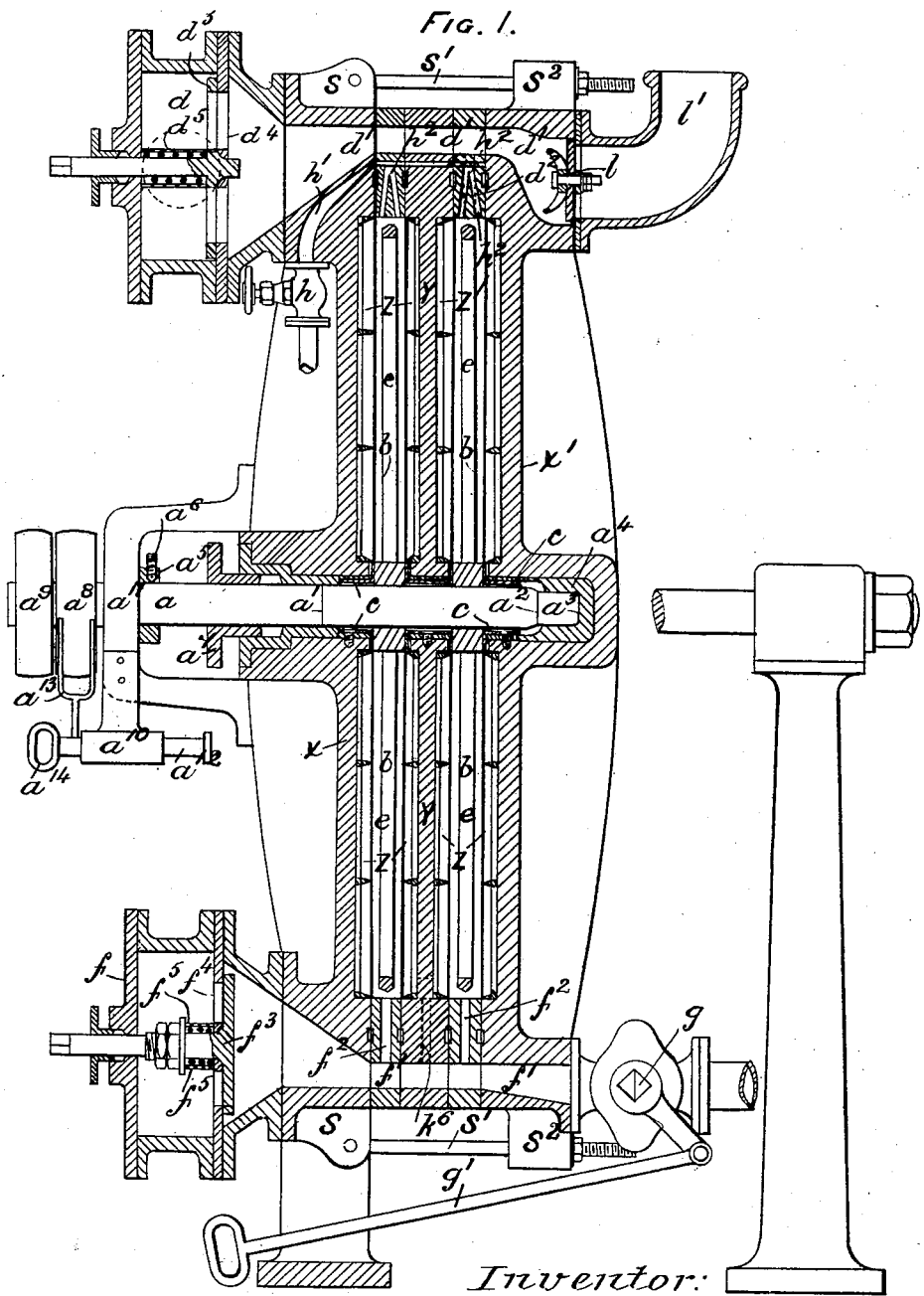

No. 628,057. Patented July 4, 1899.
J. WILLIAMSON.
FILTER PRESS.
(Application filed Nov. 13, 1897.)

(No Model.) 11 Sheets—Sheet 1.

Witnesses:
Inventor:
John Williamson
By
his Attorneys.

No. 628,057. Patented July 4, 1899.
J. WILLIAMSON.
FILTER PRESS.
(Application filed Nov. 13, 1897.)
(No Model.) 11 Sheets—Sheet 2.
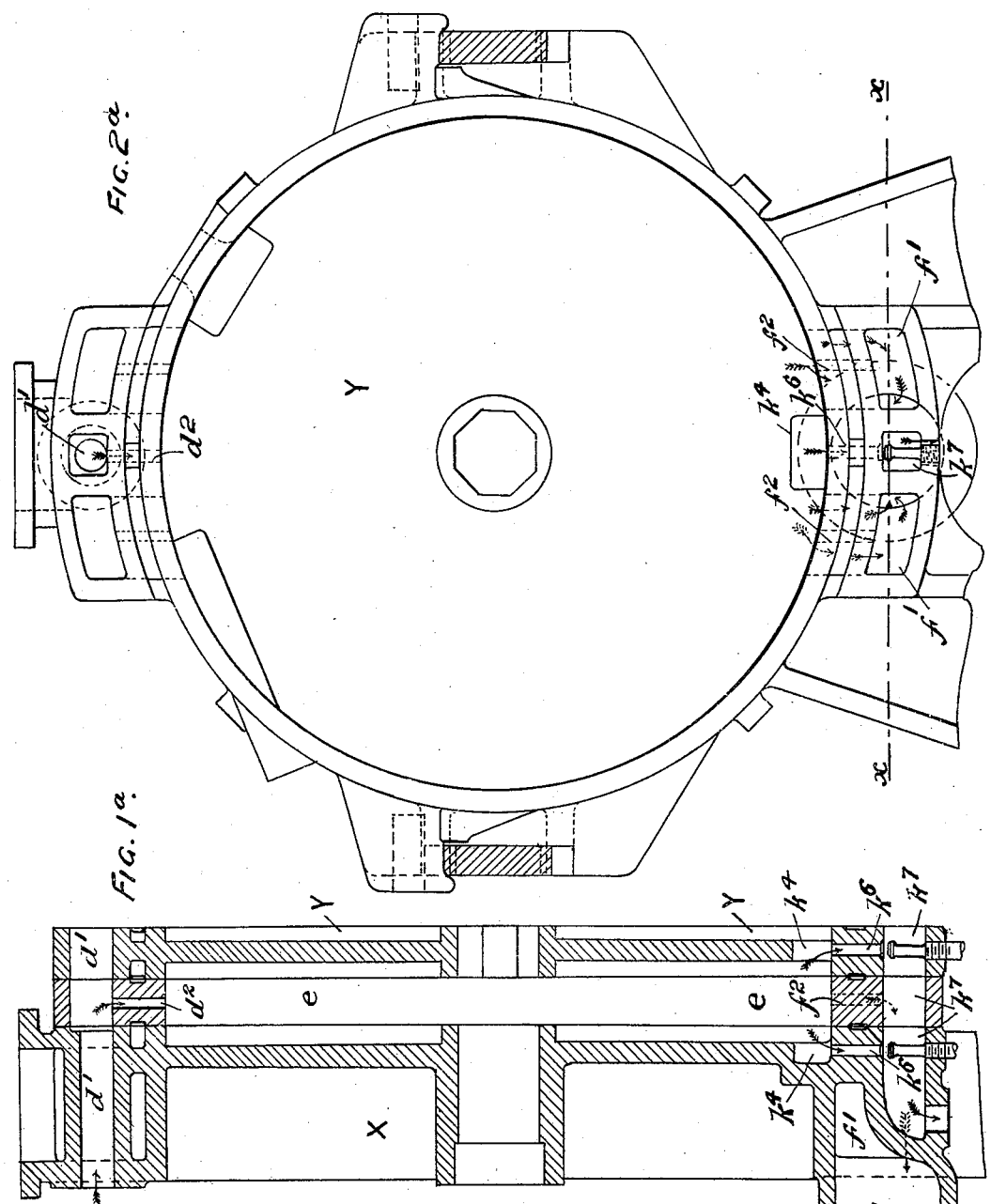

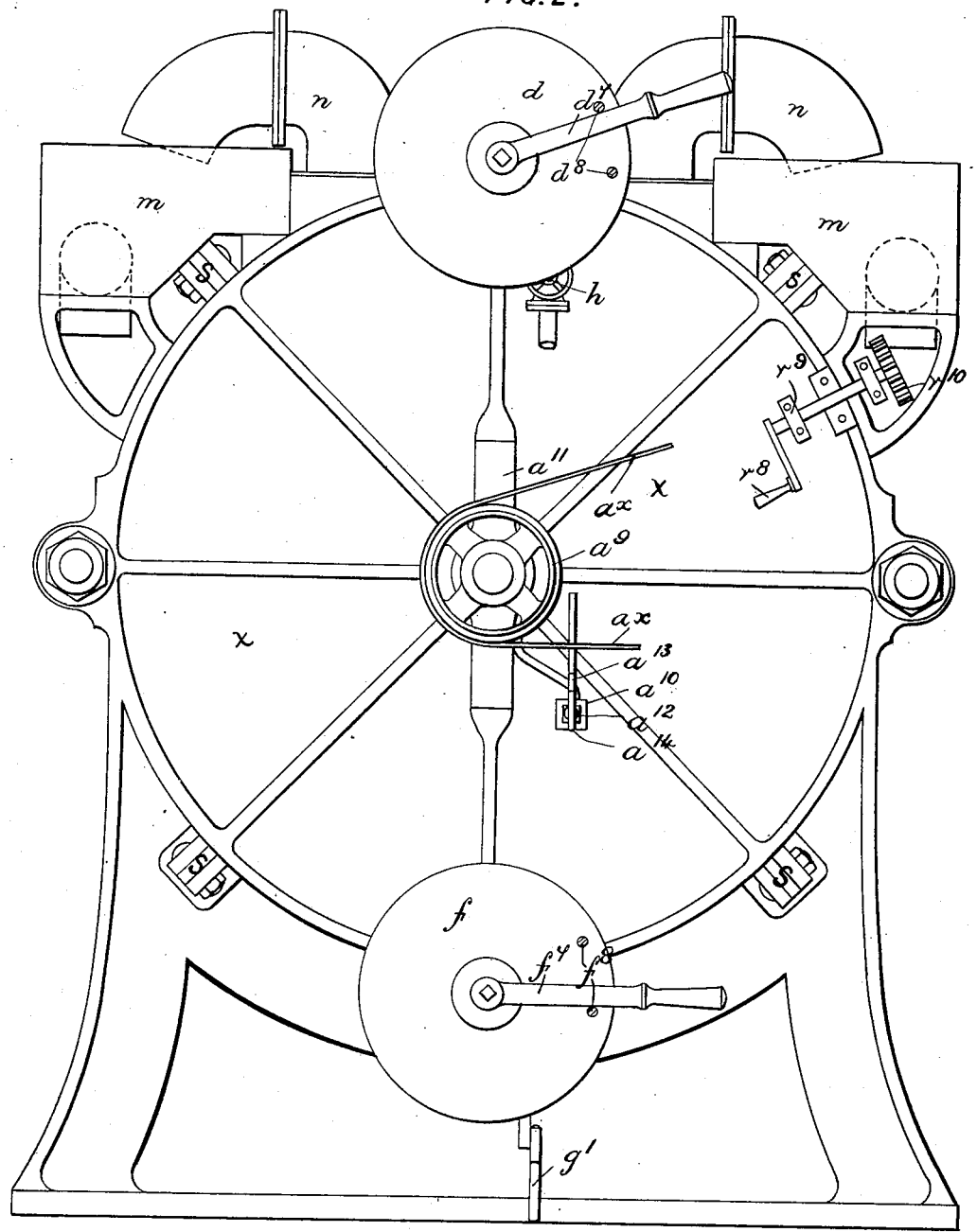

No. 628,057. J. WILLIAMSON. Patented July 4, 1899.
FILTER PRESS.
(Application filed Nov. 13, 1897.)
(No Model.) 11 Sheets—Sheet 4.
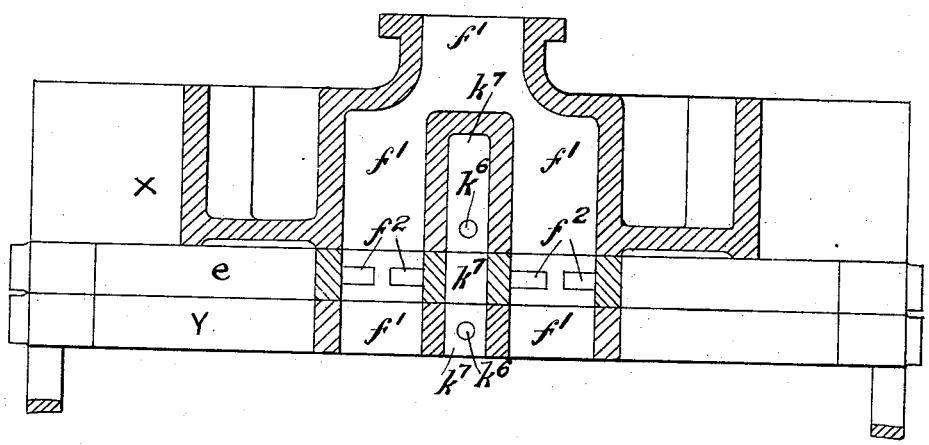

No. 628,057. Patented July 4, 1899.
J. WILLIAMSON.
FILTER PRESS.
(Application filed Nov. 13, 1897.)
(No Model.) 11 Sheets—Sheet 5.

Witnesses
Inventor:
John Williamson
By
his Attorneys

No. 628,057. Patented July 4, 1899.
J. WILLIAMSON.
FILTER PRESS.
(Application filed Nov. 13, 1897.)
(No Model.) 11 Sheets—Sheet 6.
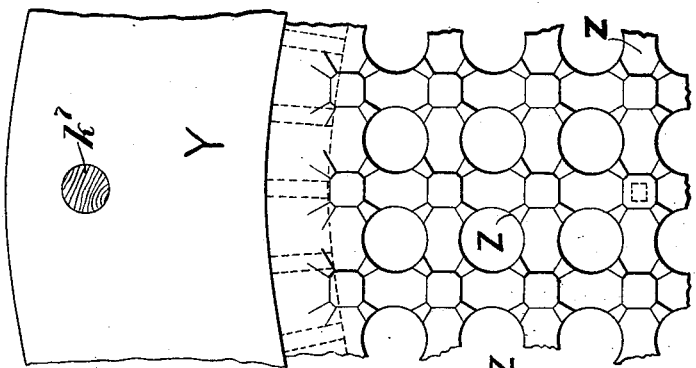
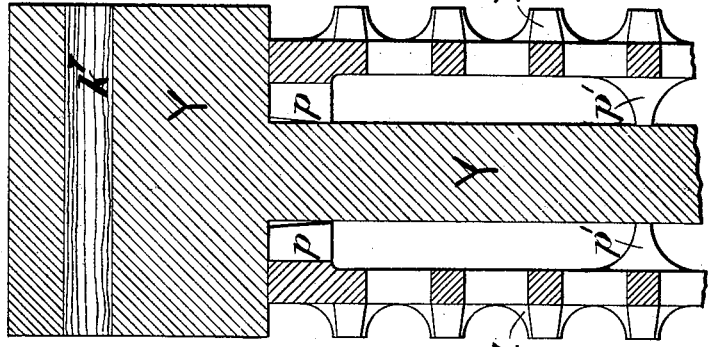
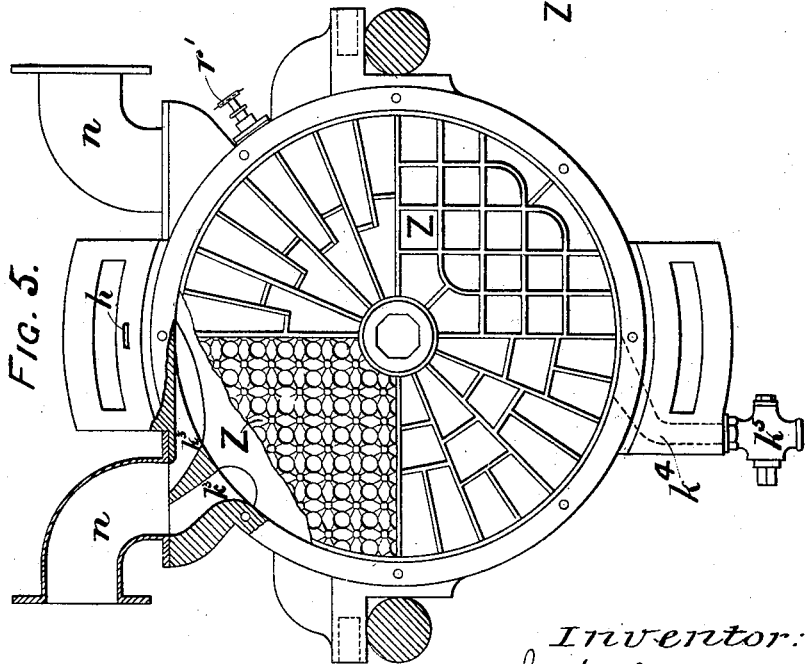
Witnesses:
Inventor:
John Williamson
By Richardson
his Attorneys.

No. 628,057. Patented July 4, 1899.
J. WILLIAMSON.
FILTER PRESS.
(Application filed Nov. 13, 1897.)
(No Model.) 11 Sheets—Sheet 7.
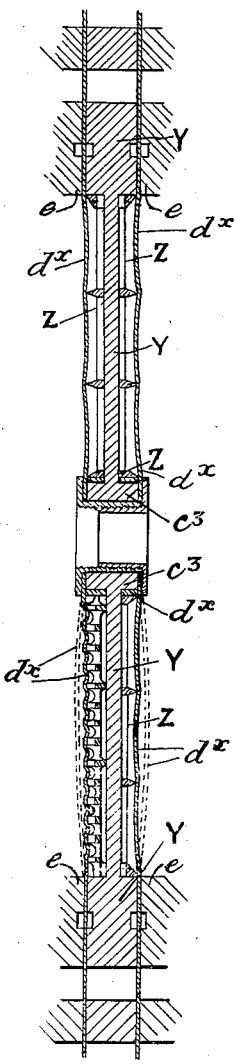
FIG. 6ᵃ.
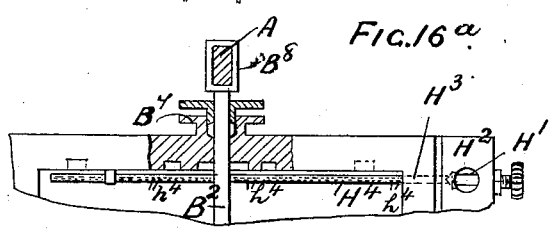
FIG. 16ᵃ.
Witnesses: Inventor:
E. B. Rolton John Williamson
By _his Attorneys._

No. 628,057. Patented July 4, 1899.
J. WILLIAMSON.
FILTER PRESS.
(Application filed Nov. 13, 1897.)
(No Model.) 11 Sheets—Sheet 8.
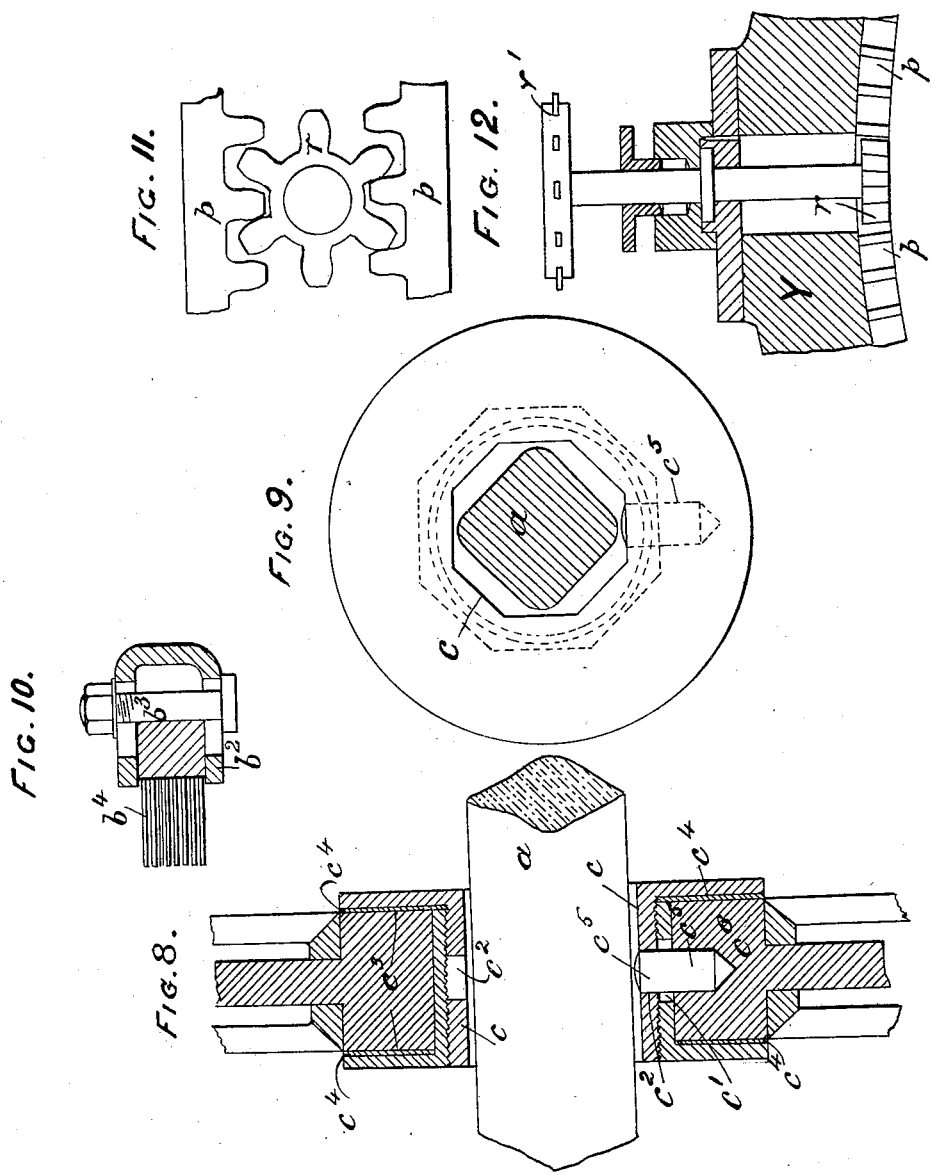

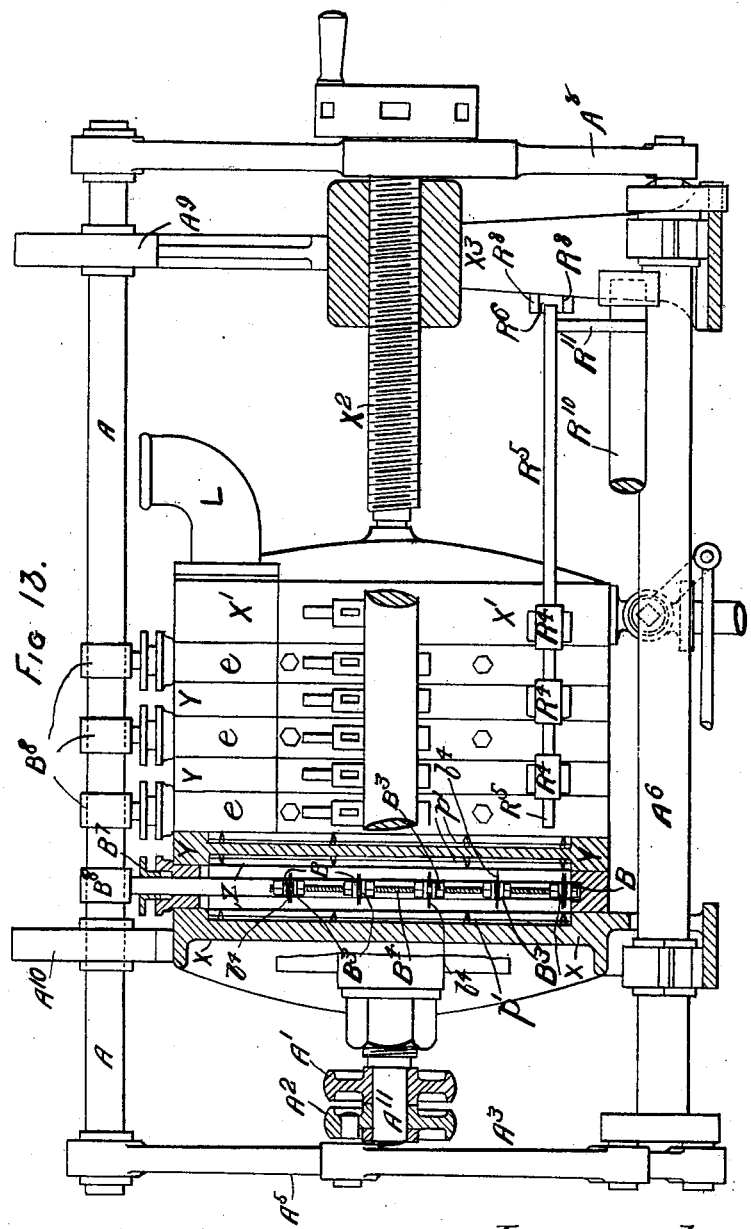

No. 628,057. Patented July 4, 1899.
J. WILLIAMSON.
FILTER PRESS.
(Application filed Nov. 13, 1897.)
(No Model.) 11 Sheets—Sheet 10.
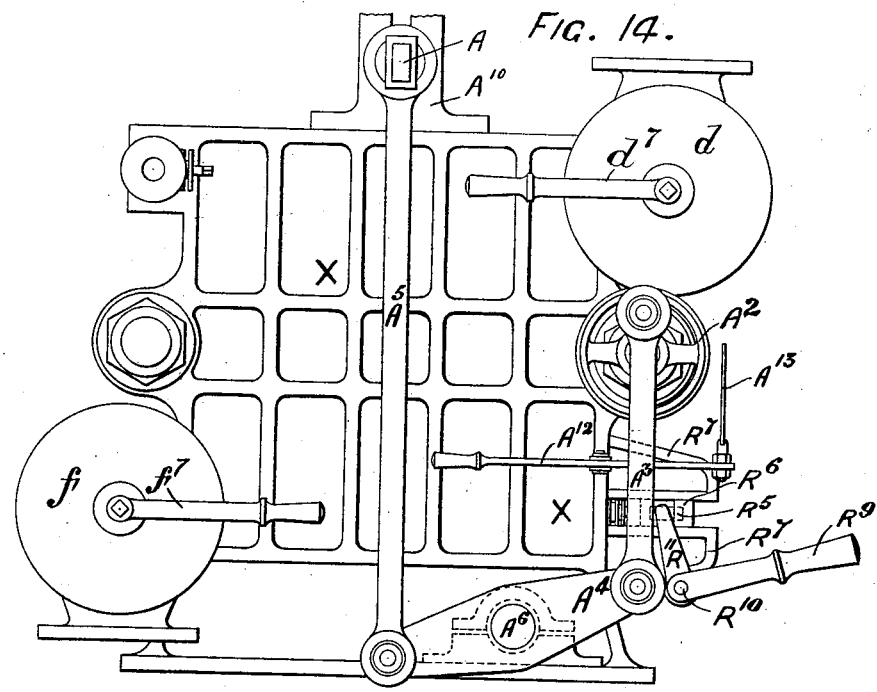
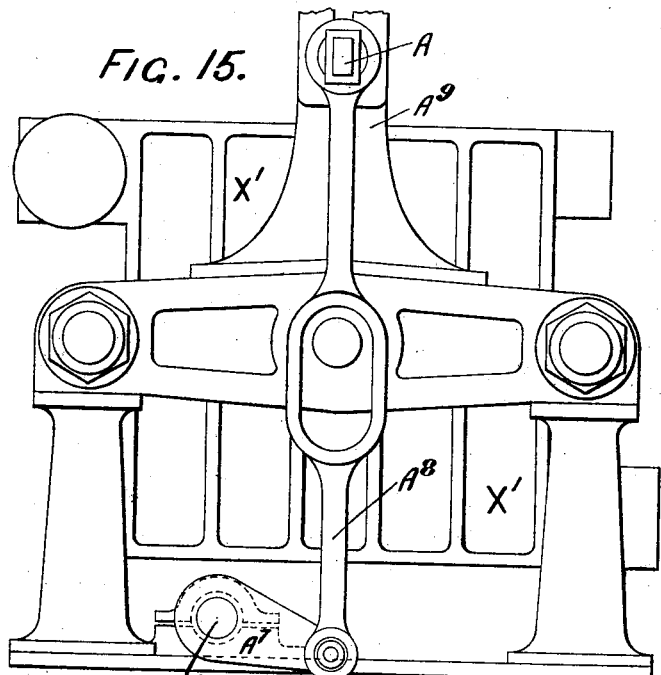

No. 628,057. Patented July 4, 1899.
J. WILLIAMSON.
FILTER PRESS.
(Application filed Nov. 13, 1897.)
(No Model.) 11 Sheets—Sheet 11.
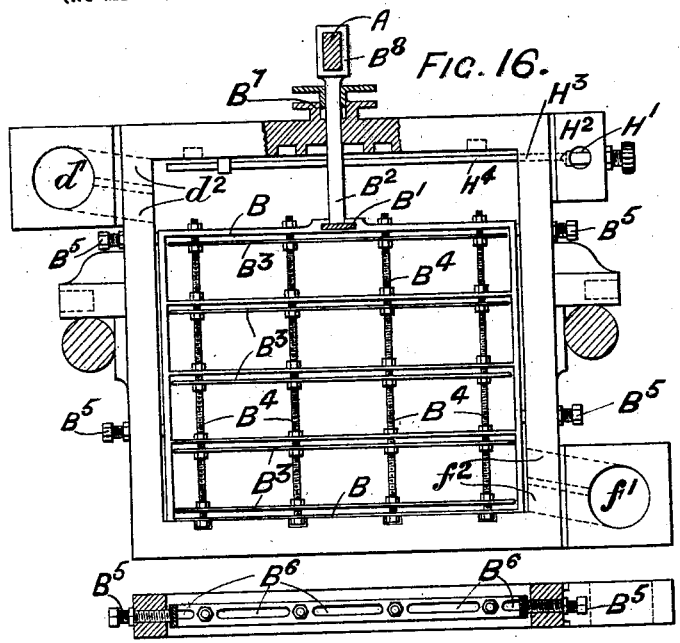
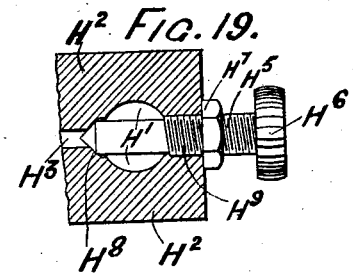
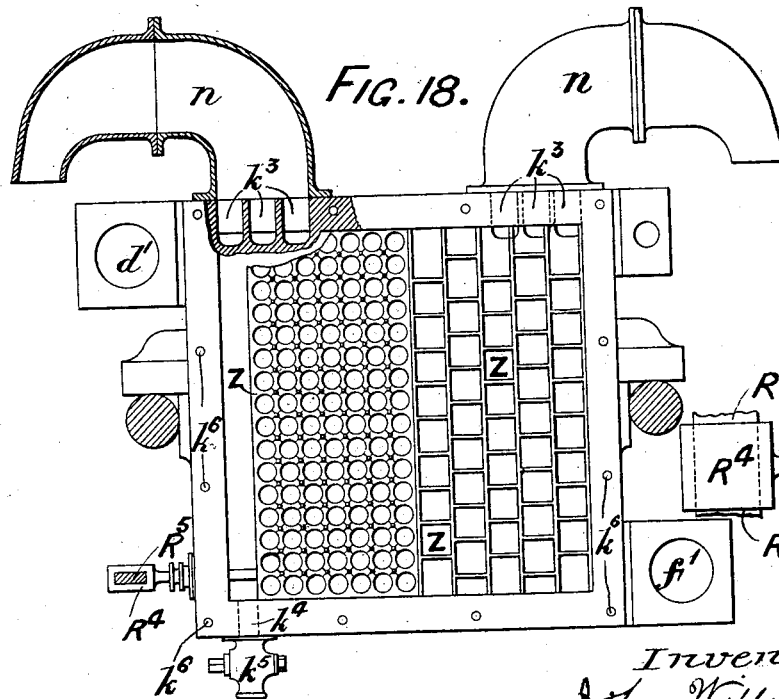
Inventor: John Williamson
By Richardson
his Attorneys
Witnesses:

UNITED STATES PATENT OFFICE.

JOHN WILLIAMSON, OF GLASGOW, SCOTLAND.

FILTER-PRESS.

SPECIFICATION forming part of Letters Patent No. 628,057, dated July 4, 1899.

Application filed November 13, 1897. Serial No. 658,421. (No model.)

*To all whom it may concern:*

Be it known that I, JOHN WILLIAMSON, chemical engineer, of 65 West Regent street, Glasgow, in the county of Lanark, Scotland, have invented certain new and useful Improvements in and Relating to Filter-Presses and Similar Filtering Apparatus, (which have been patented in Great Britain by Letters Patent dated October 3, 1896, No. 21,934, and in Belgium, dated July 12, 1897, No. 129,422,) of which the following is a specification.

This invention, which relates to filter-presses and similar filtering apparatus, has for its object the provision of means for preventing clogging or choking of the interstices of the filter-cloth in filtering impure water, such as river or canal waters, liquors or juices, turbid, chemical, or other liquors, and sugar-juices containing flocculent, albuminous, gummy, or like matters which do not readily form cakes in a filter-press. To that end either I mount a shaft to pass through the series of plates in the press, (which may be of ordinary form,) so that it is capable of rotation or oscillation, and in each filtering-chamber between said plates I fit a brush or series of brushes upon arms or spokes of a wheel secured upon the central shaft, or in each filtering-chamber I insert a shaft or spindle capable of a reciprocating motion, to which I fit cross-arms having brushes attached. These brushes may or may not be maintained out of contact with the surface of the filter-cloth during filtration and they may or may not be kept in motion during filtration, according to the character of the material being filtered. The liquor to be filtered is maintained under a head or pressure, and the filtered liquor after passing through the filter-cloth may be drawn off at either the top or bottom of each chamber, according to the particular manner in which I brush the face of the filter-cloth. When the discharge of filtered liquor decreases owing to the partial clogging of the filter-cloth, the admission of liquor is stopped and that remaining in the filter-chambers is run off, air being freely admitted, when the filtered liquor is drawn from the top of the plates. The shaft or shafts, with the brushes attached, is or are then rotated, oscillated, or reciprocated, and owing to the relief of pressure on filter-chamber sides of the filter-cloth, combined with the pressure of filtered liquor retained on the other side, the filter-cloths sag and come into sufficiently close contact with the brushes to enable the brushes to detach the material adhering to the cloth. The filtered liquor in the clear-liquor spaces oozes through the cloth and serves to wash away the obstructing material. The filtering operation is then recommenced by turning on cocks or valves to admit the liquor under pressure into the filter-chambers, as previously described.

Figure 3:
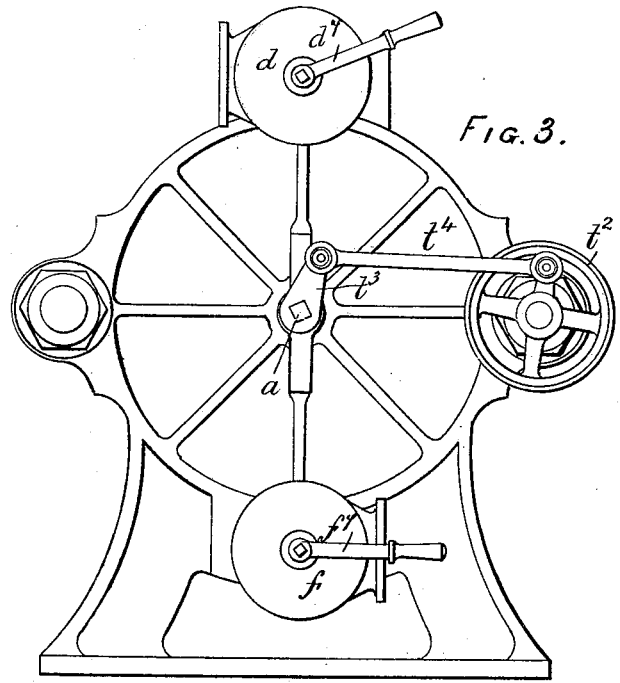
Figure 4:
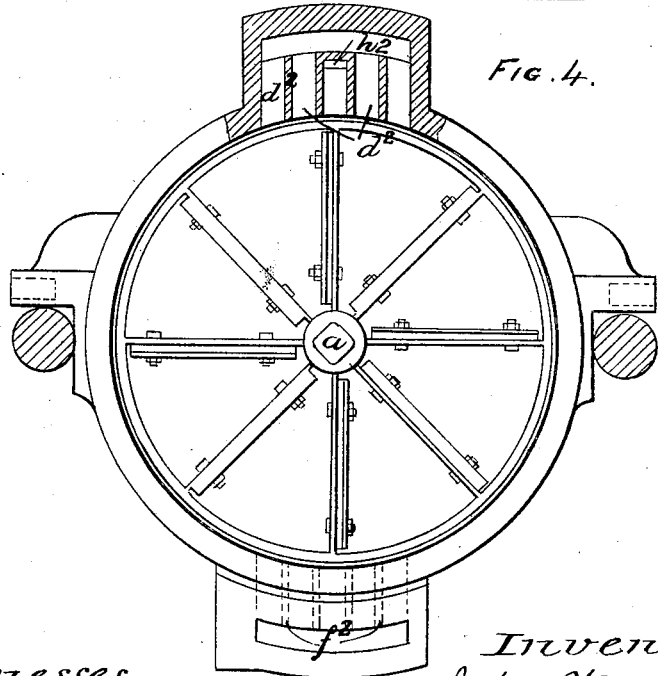

In the accompanying drawings, which illustrate the invention, Figures 1 and 2 are respectively a longitudinal section and end elevation of my improved press, where provision is made for the brushes to rotate. Fig. $1^a$ is a view corresponding to Fig. 1, but taken on a different line of section, of a portion of the filter-press with the gratings removed, showing more clearly the inlets and outlets for the unfiltered and filtered liquor. Fig. $2^a$ is an end elevation of Fig. $1^a$ looking from the right; and Fig. $2^b$, an inverted horizontal section taken on the line $x\,x$, Fig. $2^a$. Fig. 3 is an end elevation showing the general arrangement for causing the brushes to oscillate. Fig. 4 is an elevation and part section of one of the frames and also of one of the wheels which carry or hold the brushes. Fig. 5 is an elevation and part section of one of the plates upon which the filtering-cloth or other medium is stretched. Figs. 6 and 7 are an enlarged cross-section and an elevation of one form of perforation or grating which is beneficially applied in the construction of my apparatus; and Fig. $6^a$ shows, to a larger scale, the filter-cloth in position on the grating. Figs. 8 and 9 are a cross-section and elevation of plate, grating, and center flanges, showing the method of fitting on the cloth water-tight and of securing the flanges free from liability to rotate. Fig. 10 is a section of the spokes of the wheel, showing the method of holding the brush and allowing of the adjustment of the same. Fig. 11 is an end view of the rack-and-pinion gearing, which is fixed on or forms the outer rim of the circular gratings. Fig. 12 is a section of the shaft attached to the pinion, showing how it is fixed to the edge or rim of the plate. Fig. 13 is a longitudinal section and part elevation of my form of apparatus when the plates are square and the brushes are manipulated in a reciprocating manner. Figs. 14 and 15 are the respective end elevations of this form of apparatus. Fig. 16 is an elevation and part section of the frames thereof, showing also the method of holding and adjusting the brushes; and Fig. 16$^a$ is a detail view of the part of the apparatus shown in Fig. 16. Fig. 17 is a horizontal section of the parts shown in Fig. 16. Fig. 18 is an elevation and part section of the plates of this form of apparatus. Fig. 19 is an enlarged section of the arrangement for regulating the admission of water or other liquid while the brushes are at work. Fig. 20 is a section of the plates and the gratings, showing in this form of apparatus how the position of the grating is altered.

The apparatus resembles in general contour an ordinary filter-press and comprises the usual framing X X', with plates Y and gratings Z, upon which latter the filter-cloth or other filtering medium is stretched. Through the center of the press I insert the shaft $a$, which varies in form throughout its length, as follows: From the outer end to the part marked $a'$ it is round. Between $a'$ and $a^2$ it assumes a square shape, with rounded edges, as shown in section in Fig. 9. Between $a^2$ and $a^3$ it is of a similar square shape, but reduced in size. The center holes of the wheels $b$, which carry the brushes, are shaped to suit this shaft, so that the wheels while rotated by the shaft possess a free lateral motion. When the plates Y and frames X X' are screwed up tight and the shaft $a$ inserted till the point $a^3$ firmly rests upon the end of the journal $a^4$ provided for it, the shaft is then prevented from working out by the roller $a^5$, which is fixed on by the screwed pin $a^6$. The brass flanges $c$ are made large enough to allow the square part of the shaft to revolve freely without coming in contact with them. On the shaft emerging from the press a gland $a^7$ is provided to prevent any leakage of the liquids from the inside. On the outside end are fixed two pulleys $a^8$ and $a^9$, one loose and the other firmly secured. An arm $a^{10}$, attached to the bracket $a^{11}$, holds a rod $a^{12}$ for shifting the belt by means of an ordinary fork $a^{13}$, actuated by the handle $a^{14}$.

The liquid to be filtered is admitted by means of the valve $d$ and channels $d'$ and $d^2$ (see Figs. 1, 1$^a$, 2, 2$^a$, 2$^b$, and 3) into the filtering-chambers $e$, in which are the wheels $b$, holding the brushes, the clear liquid passing in the usual way through the filter-cloth at $d^\times$, (shown particularly in Fig. 6$^a$,) which is supported by the gratings Z or plates Y, and the clear liquid thereafter passing by way of the hole $k^4$ and channels $k^6$ $k^6$ in the filter-plates Y to a common chamber formed by the holes $k^7$ in each plate being brought opposite each other and opposite a like hole in one of the end plates, which is provided with a cock $k^5$, normally closed, but opened periodically for the purpose hereinafter described.

When the deposit upon the cloth becomes so great as to render it necessary to be removed, the valve $d$ is shut and the valve $f$ opened. This allows the liquid inside the chambers to be run off by the channels $f^2$, and the valve $f$. When this is done, the valve $f$ is shut, the wheels $b$, with the brushes, set in motion, and the cock $g$ opened by means of the rod $g'$. The cloths at this stage, because of the filtered liquor between them and the plates $y$, are caused to sag against the brushes with sufficient pressure for these latter to remove the deposit therefrom, which is run off by the channel $f'$ and the cock $g$.

If necessary, a supply of pure water or of the unfiltered material can be admitted by the cock $h$ and channels $h'$ $h^2$, which, because of the line of section, are most clearly shown in Fig. 1, for the purpose of assisting the brushes, such liquid escaping through the passages $f^2$ $f'$ by the cock $g$.

In exhausting the chambers of their contents prior to the brushes being set in motion it is necessary to admit air, and this is done automatically by means of a rubber and gridiron valve $l$, such valve being fitted with an upturned tube $l'$ for the conservation of any liquid which may pass the valve during filtration. The filtered liquid, contrary to usual practice, ascends by the petty channels $k^3$, as shown in Figs. 5 and 18, and escapes by the flat pipes $n$ into the gutters $m$, said gutters being supported by brackets attached to the fixed head X and the loose head X'. These gutters are preferably made light in weight, as in opening out the press they must of necessity be first removed. Each plate Y and the fixed and loose heads X X' are provided with a cock $k^5$, which by means of the channel $k^4$ (see Fig. 1$^a$) enables all the filtered liquid behind the cloth to be removed when desired. It is not absolutely necessary that the filtered liquid be removed from the top of the plates, but in general practice it has been found that such method is the preferable one.

The emptying of the filter-chamber causes the cloth or other filtering material to press against the brushes for the purpose of being cleaned; but if the cloth sag so much as to press with too great a force against the brushes the cloths must be stretched over the plates with greater tightness, and the method I adopt to effect that is illustrated in Figs. 6 and 7.

For the purpose of fixing the brushes to the revolving wheel or wheels $b$ I make the spokes of said wheels in the form shown in Figs. 4 and 10—that is to say, U-shaped—small bolts $b^3$ being entered through slots in the U-shaped sides in order to clamp the brushes. When the nuts on the bolts $b^3$ are slackened, the brush $b^4$ can be removed, set in the proper position, and retained there firmly by again screwing up the nuts $b^3$.

The brushes employed may be any ordinary form of brush suitable to the particular form of spoke adopted. The hair or bristles of the brushes may be of any description, provided it is firm enough for the purpose of brushing the cloths, and it may be constructed of metal, according to the nature of the liquid to be filtered.

In fixing the brushes in the spokes it is necessary to allow the bristles to project a sufficient distance beyond the spoke, and the spoke must have sufficient clearance within the frame to allow of this projection, as it is desirable that the cloths should not come in contact with the spoke, but with the brush contained therein.

In securing the cloths to the center of the plates and rendering them water-tight use is made of the general form of flanged nuts for this purpose; but as provision must be made for preventing them from being unscrewed, and thereby slackened by the revolving of the internal brush-wheels, I furnish the female nut with a slot $c'$, as shown in Fig. 8, the length of which may be double its width. The male screw is provided with four or eight similar slotted holes $c^2$, any one of which will correspond with the slot in the female screw when they are tightened up. The jointing at $c^3$ is preferably effected by thin india-rubber washers $c^4$, so that in tightening up sufficient play is allowed to bring one of the holes in the male screw exactly above the slot in the female screw, while the joint is kept perfectly tight. When this is done, a pin $c^5$ is dropped into the hole in the plate $c^6$, specially bored to receive it, and as it passes through the two slots they become locked and the male screw is unable then to work out.

In the usual design of filter-presses the surface of the plates upon which the cloth rests is generally grooved in one or a combination of directions, this being performed upon the surface of the plate itself. In my improved apparatus I make the plates Y with a recess on both sides, and into this recess I place a framework or grating Z, such as illustrated in Figs. 5, 6, 7, and 8. The metal against which the cloth rests during filtration and which has the effect of retarding filtration at that spot is reduced to as small a size as possible, in doing which it assumes any of the forms shown in Fig. 5 or of the two forms shown in Fig. 18. I also construct these gratings so as to allow of a free open space between the back of such and the surface of the plate, this being done by providing the back of the gratings with several small projections $p'$, which serve to support the grating without interfering materially with this clear space. The object of this arrangement is to insure perfect freedom for the filtered liquid to escape from the apparatus and to enable filtration to be conducted at a correspondingly lower pressure. I also make provision for shifting the position of the projecting parts of these frames by slightly rotating them while the brushes are being revolved and the cloth is in contact therewith or simultaneously with the starting of the brushes to revolve or oscillate. For this purpose I provide the outside rim of the grating with teeth $p$, as shown in Figs. 6 and 11, so as to form a circular rack, in which works the pinion $r$. This pinion is actuated by means of the outside wheel $r'$, which is either a toothed wheel gearing into a similar wheel on the next plate or is provided with snugs to accommodate a chain, as at Fig. 12. Motion is imparted to the toothed wheel by means of the handle $r^8$, the shaft attached to which is supported by the bracket $r^9$, which is bolted to the fixed head, all as shown in Fig. 2. The toothed wheel $r^{10}$ may be replaced by a wheel with snugs if a chain is used, the mode of affixing the latter being shown. The chain after going around the last wheel $r'$ passes around an idle-wheel $r^{11}$, which is capable of adjustment within or on the slotted bracket $r^{12}$, attached to the fixed head. If it is desired to open out the filter, the wheel $r^{11}$ is shifted along the slot as far as possible, by which means the chain can be freed from the wheels and replaced when the filter is closed up again.

The channels for the admission of the unfiltered liquid to the filtering-chambers are usually made round; but in my apparatus, where the plates are non-circular in form, I make these channels $d'$ $f'$ non-circular also or wide and shallow, and in the two end frames this rectangular channel is formed into the circle where the inlet-valve and air-valve are respectively attached, as shown in Figs. 1$^a$ and 2$^a$. The advantage gained is that the petty channels $d^2$ and $f^2$ can be made larger and more numerous, as shown in Fig. 4, affording in the case of slightly impure water, where the flow is great, quick access to and egress from the filtering-chambers.

The channel $h'$, Fig. 1, for the admission of the water or unfiltered liquid used in washing the surface of the cloths while brushing is formed below the main inlet-channel $d'$ in the center, as shown in Figs. 4 and 5. For the purpose of causing this water or unfiltered liquid to impinge upon the top of the cloth or in whatever direction it is found that this water or unfiltered liquid serves best to scour the face of the cloths I incline the petty channels $h^2$ in such a way as to effect this purpose.

In squeezing the plates and frames together I adopt the usual plan—namely, I apply the compressing power by means of a strong screw $X^2$, working in the standard $X^3$, which supports one end of the side bars, as shown in Fig. 13, or at regular intervals I provide the fixed end frame X of the press with snugs $s$, to which are adapted the bolts $s'$. These bolts fit into corresponding snugs $s^2$ on the loose end or frame, enabling the plates and frames to lie tightly screwed close together.

As the time occupied in emptying the chambers of their liquid contents and thereafter removing the deposit from the face of the cloths by the rotation or oscillation of the brushes must be reduced to a minimum for the admission of the unfiltered liquid, I employ a valve constructed as shown at $d$ in Fig. 1, and for the removal of the contents of the filtering-chambers prior to brushing the cloths I employ a valve constructed as shown at $f$, Fig. 1. In both cases the valves are of the circular gridiron type; but in the case of the valve $d$ the movable plate $d^3$ is on the exterior side of the fixed plate $d^4$, while in the case of the valve $f$ the movable plate $f^3$ is on the interior side of the fixed plate $f^4$. The object of this arrangement is that when the valve $d$ is required to be kept tightly closed the pressure of the liquid itself tends toward that purpose, and similarly in the case of the valve $f$. Springs $d^5$ and $f^5$ are employed to insure the valves working tightly; but the removable spindles are of necessity different in construction, as shown, as the springs exert their power in opposite directions. Handles $d^7$ and $f^7$ are used for opening and closing these valves, and projecting pins $d^8$ and $f^8$ serve to regulate the extent of movement. (See Fig. 2.)

Instead of revolving the brushes they may be oscillated or rotated backward and forward to such an extent that every part of the surface of the cloth may be thoroughly brushed. To effect that object, I adopt the arrangement shown in Fig. 3. The bar for supporting the frames and plates on one side is extended beyond the screwing-up nut on the fixed head of the press, and this extension forms a shaft for a pulley $t^2$, while the crank of the shaft is connected to the center shaft $a$ by the crank $t^3$ and the connecting-rod $t^4$. The revolution of the wheel or pulley $t^2$ imparts the necessary motion to the brushes, the manipulation of which otherwise and the general construction throughout being all as hereinbefore described.

In order to brush the face of the cloths in a reciprocating manner, I adopt the form of press shown in Figs. 13, 14, 15, and 16. The plates Y and gratings Z are made square, the inlet-channel $d'$ being formed in snug-pieces at the top corner and the outlet for the unfiltered liquid prior to brushing of the cloths and for the brushings from the cloth being formed in snug-pieces at the opposite bottom corner, as shown at $f'$, Fig. 16.

The frame B for holding the brushes is of square or rectangular form and provision is made on the top for hooking it on the rod $B^2$ by means of the tongue B', attached to the end of the rod which is inserted in an opening at the top of the frame. The brushes are fixed in this frame horizontally back to back and are kept firmly in their place by a loose plate $B^3$, tightened up by the long bolts $B^4$ and nuts thereon. The rod $B^2$ passes through a gland and stuffing-box $B^7$ at the top of the frame and terminates in a square head $B^8$, with a rectangular slot running through it parallel to the line of the inlet-channel. Into this slot is inserted a rectangular bar A, the reciprocating motion of which is imparted to the brushes for cleaning the cloths. The brushes are kept moving in a straight line vertically by means of pins $B^5$, entering through the sides of the press-frame, the heads or points of these pins fitting into corresponding grooves in the sides of the brush-frame. The centers of the fixed cross-bars and the loose plates are perforated with longitudinal holes, as at $B^6$, Fig. 17, to enable the washings from the cloths to escape freely to the channel $f'$. The reciprocating motion is imparted to the rectangular bar A from the pulley $A^2$, which revolves on a shaft $A^{11}$, which is an extension of one of the side bars for supporting the plates. The pulley $A^2$ is connected with a lever $A^4$ by the connecting-rod $A^3$, and to the other end of the lever $A^4$ is attached another connecting-rod $A^5$, whose upper end is connected with the bar A. The lever $A^4$ is supported by a shaft $A^6$, which extends beyond the back standard. At this end of the shaft is attached a crank $A^7$, which by means of a connecting-rod $A^8$ actuates the corresponding end of the rectangular bar A. A standard-guide $A^{10}$ on the fixed head and another guide $A^9$ on the back standard serve to impart a thoroughly-vertical motion to the rectangular bar A.

The manipulation of the different valves and the starting and stopping of the brushes for the purpose of cleaning the cloths are effected in a manner similar to that adopted when the brushes revolve or oscillate. An elbow-pipe L, Fig. 13, leading to the air-valve, is provided for the automatic admission of air to the filtering-chambers. A handle-bar $A^{12}$, oscillating on a pivot attached to the fixed head, controls a fork $A^{13}$, which throws the driving-belt on or off the fast and loose pulleys $A^2$ and A'. The filtered liquid is caused to ascend, passing through the petty channels $k^3$, Fig. 18, and the pipes $n$ into suitable gutters such as previously described. A cock $k^5$ is provided for emptying the chambers formed behind the cloths.

For the purpose of stretching the cloths over the face of the plates small holes $k^6$ are provided and used as previously described. The same form of perforated framework or grating may be inserted into the recesses in the plates, as previously described in the case of an apparatus with revolving brushes and as illustrated in Fig. 18. In order, however, to shift the position of the projections $p'$ of the gratings Z so that a new portion of the filter-cloth will rest on each of the projections, the grids must be reciprocated, and the method I adopt to effect this on the circular grids is illustrated in Figs. 5, 11, and 12, and the method of reciprocating the square-shaped grids is shown by Figs. 18 and 20. The gratings Z are made with recesses for the reception of a corresponding square nut R'. This nut is screwed on the end of a spindle R after the spindle has been passed through the stuffing-box $R^2$ and gland $R^3$, the former being bolted to the edge of the plate, which is bored to receive the rod R. The outer end of this rod is provided with a square slotted head $R^4$, through which is inserted the rectangular bar $R^5$. This bar passes through slotted heads on each plate and is provided at both ends with slippers $R^6$. The slipper at the fixed end of the press moves horizontally between two brackets $R^7$, attached to the fixed head X, while the slipper at the loose end X' of the press moves between two bars $R^8$, which project from one of the legs of the back standard. The lateral motion is imparted to the bar $R^5$ by means of the handle $R^9$, which slightly rotates the shaft $R^{10}$. To this shaft are attached two arms or levers $R^{11}$, the ends of which move in corresponding slots in the slipper $R^6$ at the front end and in a slot in the bar $R^5$ at the back end. The gratings Z are made at the bottom, so that they rest upon the plate at as few points as possible, so as to reduce friction to a minimum and minimize the power required to rotate the shaft $R^{10}$. The channel H', Figs. 16 and 19, for the admission of water or the unfiltered liquid used in washing the surface of the cloths while brushing is formed in snugs $H^2$ at the top corner opposite to the channel d', which forms the inlet-channel for the unfiltered liquid. The water or unfiltered liquid may enter the filtering-chamber by the duct $H^3$, or to this duct or ducts may be attached a small copper pipe $H^4$, perforated with numerous small holes, as shown in Fig. 16$^a$, which tend to distribute the washing liquid over every part of the cloth. In order to regulate the admission of the washing liquid, the duct $H^3$ is conically drilled at the mouth, as at $H^8$, and opposite this duct there is bored a screwed hole $H^9$, into which is screwed the screw $H^5$, the end of which is made to fit tightly at the mouth of the duct $H^3$. The screw $H^5$ is actuated by the milled handle $H^6$ and the hole $H^9$ is kept water-tight by the jam-nut $H^7$. The plates Y and frames X X' of this form of apparatus may be squeezed together in either of the ways previously described.

The valve d, Fig. 14, for the admission of the unfiltered liquid and the valve f for emptying the chambers of their contents prior to brushing are both made as hereinbefore described.

The filtering medium employed in my improved apparatus may be made of any material, according to the degree of purity of the filtrate desired and according to the nature of the liquid to be filtered, provided it possesses sufficient flexibility to sag toward the brushes when the filtering-chambers are emptied of their contents. Cotton cloth has been found to be most suitable; but any other textile material can be used, including that woven from any kind of wire, provided it fulfils the conditions already named.

Having now described the invention, what I desire to claim and secure by Letters Patent is—

1. A filtering apparatus comprising the framing, the gratings movably mounted therein carrying filtering media, the movable brushes for moving over the faces of the filtering media to clean the same, means for operating said brushes, and means for moving or adjusting the position of the gratings, substantially as described.

2. A filtering apparatus comprising the framing, the gratings mounted therein and carrying filtering media, the movable brushes for cleaning the faces of the filtering media with means for operating said brushes, said brushes being normally out of contact with the filtering media, the inlet and outlet valves to said framing for controlling the flow of the fluid to be filtered, the air-inlet to said framing, and the inlet and exit valves for a cleansing fluid, substantially as described.

3. In a filter-press the combination with a rotatable shaft extending longitudinally through the center of the plates of wheels or arms secured thereon, and carrying brushes located within the filtering-chambers and normally out of rubbing contact with the filtering medium but brought into rubbing contact by emptying or partially emptying the chambers to cause sagging of the filter-cloth substantially as described.

4. A filter-press having gratings mounted movably therein and devices such as toothed pinions engaging said gratings and adapted to be operated to periodically change the position of the gratings relatively to the surface of the filtering medium resting on them, substantially as described.

Signed at Glasgow, in the county of Lanark, Scotland, this 14th day of October, 1897.

JOHN WILLIAMSON.

Witnesses:
WALLACE FAIRWEATHER,
JNO. ARMSTRONG, Junr.